W. W. SNYDER.
VEHICLE WHEEL TRUCK.
APPLICATION FILED AUG. 4, 1919.
1,343,650.
Patented June 15, 1920.
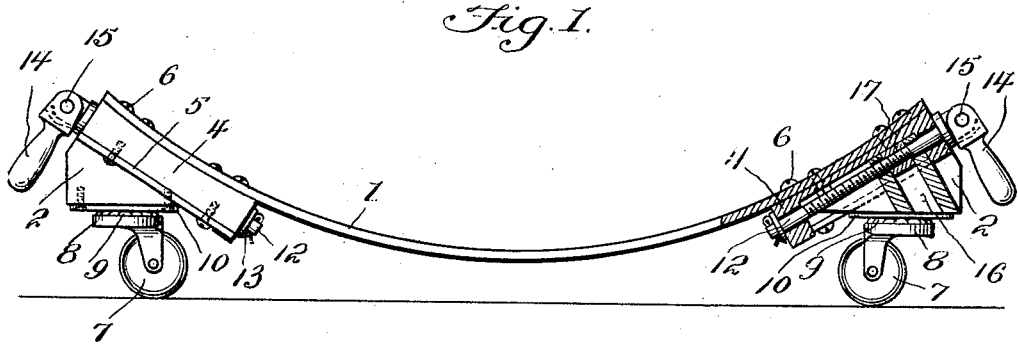
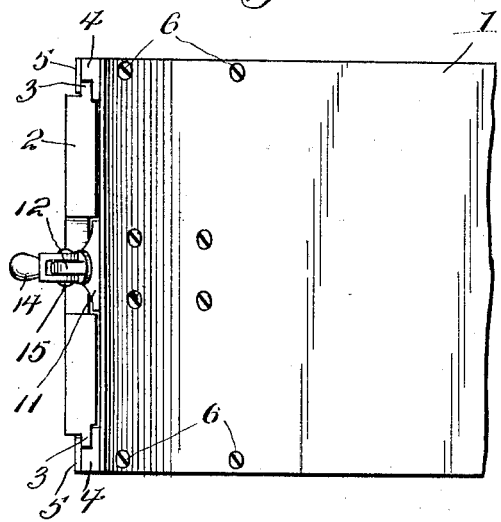
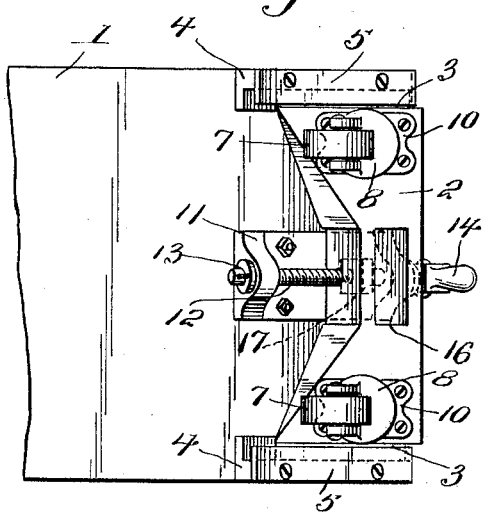
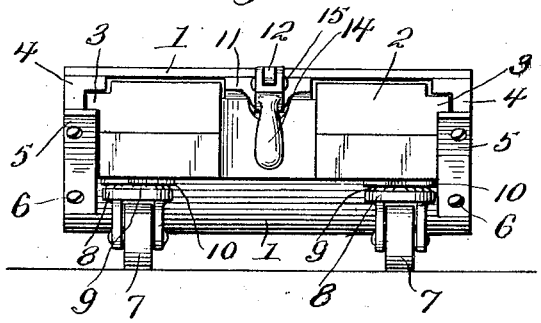
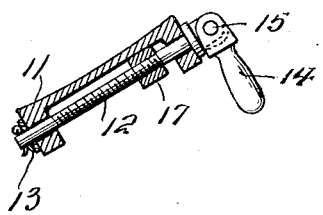
Inventor
William W. Snyder
By
Attorney

UNITED STATES PATENT OFFICE.

WILLIAM W. SNYDER, OF COHOES, NEW YORK.

VEHICLE-WHEEL TRUCK.

1,343,650.  Specification of Letters Patent.  Patented June 15, 1920.

Application filed August 4, 1919. Serial No. 315,259.

*To all whom it may concern:*

Be it known that I, WILLIAM W. SNYDER, a citizen of the United States, residing at Cohoes, in the county of Albany and State of New York, have invented certain new and useful Improvements in Vehicle-Wheel Trucks, of which the following is a specification.

This invention relates to improvements in trucks, and it is the principal object of the invention to provide a novel form of truck especially adapted for use in the placing or removal of wheels onto and from the axles of motor trucks and similar vehicles; it being understood in this connection, that the wheels of motor trucks are heavy and cumbersome and in consequence, are exceedingly difficult to handle. With the improved form of truck the difficulty and labor heretofore incident to the handling of motor truck wheels when placing the same on or removing them from the axles of a motor truck will be avoided.

Another and equally important object of the invention is to provide a truck of the character mentioned having an adjustable type of body whereby the same can be adjusted to the proper nicety in order that a wheel or wheels can be readily received thereon or removed therefrom onto a truck axle or axles. Other improvements and novel details in the construction and arrangement of parts will be appreciated from the detailed description to follow, which is to be read in connection with the accompanying drawings forming a part hereof, and wherein I disclose a preferred embodiment of the invention for the purpose of illustration.

In the drawings: Figure 1 is a side elevation of the truck having parts thereof shown in section; Fig. 2 is a fragmentary detail in top plan of the truck; Fig. 3 is a fragmentary bottom plan thereof; Fig. 4 is an end elevation of the same, and Fig. 5 is a detail in section of the means for effecting adjustment of the truck body with relation to the wheels thereof.

Having more particular reference to the drawings, in connection with which like reference characters will designate corresponding parts throughout the several views, (1) indicates the body of the truck formed in this particular instance of a concavo-convex piece, the concave side being uppermost and, obviously, serving to receive the tread of a truck wheel thereon. Of course, the particular form of body may be varied in so long as the upper side thereof is formed in a manner such as to permit snug engagement of a wheel tread therewith. End pieces or bolsters (2) having inclined upper faces are arranged adjacent the under sides of the opposite ends of the body (1) and have their respective ends reduced as at (3) to form guides, the purpose of which will be presently described. Retaining strips (4), angular in cross section, are secured to portions of the opposite sides of the body (1) and slidably engage the reduced portions (3) of the bolsters (2), locking plates (5) being removably secured to side strips (4) through the medium of fastening devices (6) and serve as means for preventing disengagement of the strips from the reduced portions (3) of the bolsters (2). Thus, it will be understood that free sliding movement between the body (1) and the bolsters (2) will be permitted and yet, disengagement between the interconnected elements will be prevented. Wheels (7) carrying anti-frictional bearing raceways (8) are provided and are swivelly engaged with the bolsters (2) at points adjacent their opposite ends, anti-frictional bearings (9) being arranged in said raceways (8) and engaging bearing plates (10) secured, in a suitable manner, to the adjacent portions of the bolsters (2). These wheels, of course, serve to permit free traverse of the vehicle in the desired direction.

As means for effecting vertical adjustment of the body (1), that is, movement between the body (1) and the several bolsters (2), brackets (11) are secured to the under sides of the body (1) adjacent its opposite ends and receive longitudinally disposed screw threaded shafts (12) therein, the opposite ends of the shafts being journaled in bearings provided on said brackets, as at (13). To facilitate rotation of the several shafts, handles (14) are pivoted to the outer ends of the same at (15) and, obviously, by arranging them at substantially right angles to their respective shafts, suitable forms of cranks will be afforded. The several brackets described are slidably received in ways formed in adjacent parts of the bolsters (2), while other ways (16) are formed in said bolsters and immovably receive screw threaded bearing elements (17) therein, which in turn, receive the screw threaded portions of their respective shafts (12)

therethrough. By reason of this mode of connection between the body and the bolsters of the improved truck, attention is directed to the fact that when the several shafts (12) are rotated in proper directions, movement between the end portions of the body and the bolsters adjacent thereto will be caused, consequently, permitting a vertical adjustment of the body (1) to the desired nicety in order that such body can be so positioned with relation to a wheel to be received thereon from an axle or with relation to an axle which is to receive a wheel arranged on the truck body as to materially facilitate the work and reduce labor to a minimum.

In using my improved truck for removing a wheel from the axle of a motor truck, the device is rolled under the motor truck wheel, said wheel having been previously elevated as by a jack, whereupon, if necessary, the body (1) thereof is adjusted vertically until it engages the adjacent portion of the tread of such motor truck wheel. At this time the motor truck wheel can be slid from its axle and during movement of the motor truck wheel, the truck forming my invention will also be moved in unison therewith, so that when the motor truck wheel is free of the axle, it will rest entirely upon the body (1) of my improved truck. At this time, the wheel can be conveyed to any desired point with but little effort on the part of the user, guiding of the truck being rendered possible due to the swivel mounting of the wheels (7). When using the truck as a means of facilitating of the placing of motor truck wheels on the axles of a motor truck, the operation above described is repeated, viz: truck body (1) is adjusted vertically until the wheel supported thereon is alined with the particular motor truck axle on which it is to be placed. At this time, the truck can be moved any direction to cause the engaging of the motor truck hub on the motor truck axle.

Manifestly, the construction shown is capable of considerable modification and such modification as is within the scope of my claims I consider within the spirit of my invention.

I claim.

1. A truck of the character described, including a body having its upper side formed to snugly receive a portion of the tread of a wheel thereon, bolsters disposed transversely of the opposite ends of said body, wheels on the bolsters, brackets secured to the under sides of the opposite ends of the body and slidably received in ways formed in adjacent portions of said bolsters, longitudinally disposed screw threaded shafts mounted in said brackets, screw threaded bearing means immovably arranged on the bolsters and receiving the screw threaded shafts therethrough, and means on the outer ends of the screw threaded shafts for facilitating rotation thereof whereby to effect sliding movement between the body and the bolsters.

2. A truck of the character described, including a body and its upper side formed to snugly receive a portion of the tread of a wheel, transverse bolsters adjacent the opposite ends of the body having their opposite ends reduced, retaining means on the sides of said body slidably engaging said reduced ends of the bolsters, wheels on the bolsters, brackets secured to the undersides of the opposite end portions of the body slidably received in ways formed in said bolsters, screw threaded shafts mounted in the brackets and disposed longitudinally of the body, screw threaded bearing means immovably arranged on the bolsters and receiving said screw threaded shafts therethrough, and means on said shafts for facilitating rotation of the same whereby to effect sliding movement between the bolsters and the adjacent portions of the body.

3. A truck of the character described, including a body, bolsters disposed adjacent the opposite ends of said body having their upper faces inclined to receive portions of the body thereon, wheels on the bolsters, brackets secured to the under sides of the opposite end portions of the body intermediate their sides and slidably received in ways formed in the intermediate portions of the bolsters, screw threaded shafts mounted in said brackets and disposed longitudinally of the body, screw threaded bearings immovably arranged on the bolsters receiving said shafts therethrough, and means on the shafts for facilitating rotation of the same whereby to effect sliding movement between the bolsters and the adjacent portions of the body.

In testimony whereof I affix my signature.

WILLIAM W. SNYDER.